(12) United States Patent
Orton (10) Patent No.: US 6,897,790 B2
(45) Date of Patent: May 24, 2005

(54) AIRCRAFT FLIGHT SECURITY SYSTEM AND METHOD

(76) Inventor: Kevin Orton, 257 Avenida Lobeiro, Unit G, San Clemente, CA (US) 92672

( * ) Notice: Subject to any disclaimer, the term of this patent is extended or adjusted under 35 U.S.C. 154(b) by 168 days.

(21) Appl. No.: 10/225,672

(22) Filed: Aug. 21, 2002

(65) Prior Publication Data

US 2003/0050745 A1 Mar. 13, 2003

Related U.S. Application Data

(60) Provisional application No. 60/340,793, filed on Nov. 30, 2001, provisional application No. 60/327,531, filed on Oct. 6, 2001, provisional application No. 60/322,902, filed on Sep. 17, 2001, and provisional application No. 60/322,197, filed on Sep. 11, 2001.

(51) Int. Cl.$^7$ .............................................. G08B 21/00
(52) U.S. Cl. .................... 340/945; 340/426.1; 340/5.2; 340/5.8; 713/202
(58) Field of Search ........................ 340/426.1, 426.11, 340/945, 5.2, 5.21, 5.8, 5.81, 5.82, 5.1, 5.31; 713/202

(56) References Cited

U.S. PATENT DOCUMENTS

| | | |
|---|---|---|
| 3,665,386 A | 5/1972 | Dosch |
| 3,931,943 A | 1/1976 | Westergren et al. |
| 4,030,378 A | 6/1977 | Kroesser |
| 4,158,874 A | 6/1979 | Ellsberg |
| 4,210,899 A | 7/1980 | Swonger et al. |
| 4,494,114 A | 1/1985 | Kaish |
| 4,651,157 A | 3/1987 | Gray et al. |
| 4,665,395 A * | 5/1987 | Van Ness ................. 340/5.25 |
| 4,797,657 A | 1/1989 | Vorzimmer et al. |
| 4,811,230 A | 3/1989 | Graham et al. |
| 4,833,442 A | 5/1989 | Von Heck |
| 4,947,163 A * | 8/1990 | Henderson et al. ........ 340/5.25 |
| 5,063,371 A | 11/1991 | Oyer et al. |

(Continued)

FOREIGN PATENT DOCUMENTS

| | | |
|---|---|---|
| DE | 3327076 A1 | 1/1985 |
| GB | 2 299 427 A | 10/1996 |
| GB | 2 313 964 A | 12/1997 |
| GB | 2 354 991 A | 4/2001 |

OTHER PUBLICATIONS

BAE Systems, "Electronic Flight Control System—C–17 Globemaster III Fly–By–Wire Flight Control", 2001, http://www.na.baesystems.com/controls, 2 pp..

"Electronic Control Systems", Sep. 17, 2001, http://www.t-pub.coom/air/9–11.htm, 1 p.

Primary Examiner—Benjamin C. Lee
(74) Attorney, Agent, or Firm—Orrick, Herrington & Sutcliffe LLP (57) ABSTRACT

A system of securing access to vehicle control systems using non-persistent identifiers. Identifiers are received and stored at the commencement of vehicle operations. Restricted events are detected and confirmation identifiers are requested, in order to continue vehicle operations. If confirmation identifiers are not presented, vehicle operations enter caution mode, and access to vehicle controls is restricted. Upon termination of a vehicle trip, the non-persistent identifiers are discarded. The system provides a convenient, low-overhead, secure means of regulating access to vehicle control systems.

56 Claims, 7 Drawing Sheets

U.S. PATENT DOCUMENTS

| | | | |
|---|---|---|---|
| 5,111,185 A | | 5/1992 | Kozaki |
| 5,140,317 A | * | 8/1992 | Hyatt et al. ................. 340/5.25 |
| 5,229,648 A | | 7/1993 | Sues et al. |
| 5,335,748 A | | 8/1994 | Wilson |
| 5,479,162 A | | 12/1995 | Barger et al. |
| 5,650,774 A | | 7/1997 | Drori |
| 5,751,606 A | * | 5/1998 | Migachyov et al. ........ 700/282 |
| 5,774,858 A | | 6/1998 | Taubkin et al. |
| 5,790,791 A | | 8/1998 | Chong et al. |
| 5,801,616 A | | 9/1998 | Ghazarian et al. |
| 5,821,871 A | | 10/1998 | Benzier |
| 5,908,178 A | | 6/1999 | Sandhagen |
| 5,917,405 A | | 6/1999 | Joao |
| 5,933,098 A | | 8/1999 | Haxton |
| 5,986,543 A | | 11/1999 | Johnson |
| 6,002,427 A | * | 12/1999 | Kipust ........................ 348/156 |
| 6,044,470 A | * | 3/2000 | Kuriyama ................... 713/202 |
| 6,100,811 A | | 8/2000 | Hsu et al. |
| 6,119,096 A | | 9/2000 | Mann et al. |
| 6,192,416 B1 | | 2/2001 | Baxter |
| 6,262,720 B1 | | 7/2001 | Jeffrey et al. |
| 6,434,700 B1 | * | 8/2002 | Alonso et al. .............. 713/169 |
| 6,710,700 B1 | * | 3/2004 | Tatsukawa et al. ........ 340/5.53 |
| 6,732,278 B2 | * | 5/2004 | Baird et al. ................. 713/201 |
| 2001/0032212 A1 | * | 10/2001 | Sano ........................ 707/104.1 |
| 2002/0026573 A1 | * | 2/2002 | Park ........................... 713/155 |
| 2002/0095588 A1 | * | 7/2002 | Shigematsu et al. ........ 713/186 |
| 2002/0112183 A1 | * | 8/2002 | Baird et al. ................. 713/201 |
| 2003/0005338 A1 | * | 1/2003 | Solioz ........................ 713/202 |
| 2003/0068044 A1 | * | 4/2003 | Nikolsky .................... 380/258 |
| 2004/0049696 A1 | * | 3/2004 | Baker et al. ................ 713/201 |

* cited by examiner

AIRCRAFT FLIGHT SECURITY SYSTEM AND METHOD

PRIORITY INFORMATION

This application claims the benefit of the following U.S. Provisional Applications: Application No. 60/322,197 filed on Sep. 11, 2001; Application No. 60/322,902 filed on Sep. 17, 2001; Application No. 60/327,531 filed on Oct. 6, 2001; and Application No. 60/340,793 filed on Nov. 30, 2001.

FIELD OF THE INVENTION

This invention relates to vehicle security and public security in general, and more particularly to preventing unauthorized use of vehicles such as commercial aircraft.

BACKGROUND AND SUMMARY

Commercial aircraft are favorite targets of hijackers. It is desirable to prevent hijackers from taking unauthorized control of aircraft, as such hijacking activities compromise public safety. Due to the nature of aircraft operation, the pilots need immediate access to the controls at all times during the flight in order to insure and provide for a safe flight. The use of locks or keys can put access to the controls in jeopardy while flying. The use of persistent access codes, such as a password keyed to each individual pilot causes administrative problems for the airline. This is because pilots and crew change aircraft constantly, and often with little advance notice. Tight schedules preclude easy transfer of access codes from one aircraft to another. Storing large numbers of access codes on board each aircraft presents security risks. Furthermore, access codes and passwords must be updated constantly in order to provide good security, causing an additional administrative burden. Thus a better technique is required.

Embodiments of this invention provide systems whereby vehicles such as commercial aircraft may be effectively protected from unauthorized operating by hijackers or terrorists, without undue administrative burden on the part of the airline or crew. Furthermore, it is practical and cost effective. In an aspect of an embodiment of the invention, a non-persistent identifier is used to establish the identity of authorized personnel. Subsequently, when an unusual event is detected, or at certain specified points during the vehicle trip, the authorized personnel's identity is confirmed by re-entry of the non-persistent identifier, as a confirmation identifier, before the vehicle is allowed to continue with normal operations. When the trip is completed, the non-persistent identifiers are deleted.

DETAILED DESCRIPTION OF THE PREFERRED EMBODIMENTS

For sake of clarity, the embodiment discussed herein is made with reference to a commercial aircraft such as a passenger or cargo-carrying aircraft. However, those skilled in the art will appreciate that alternate embodiments of the invention are also possible in general for vehicles of any sort. For example, busses, trains, ships, and other such vehicles can all be equipped with alternate embodiments of the systems and methods discussed herein.

Figure 1:
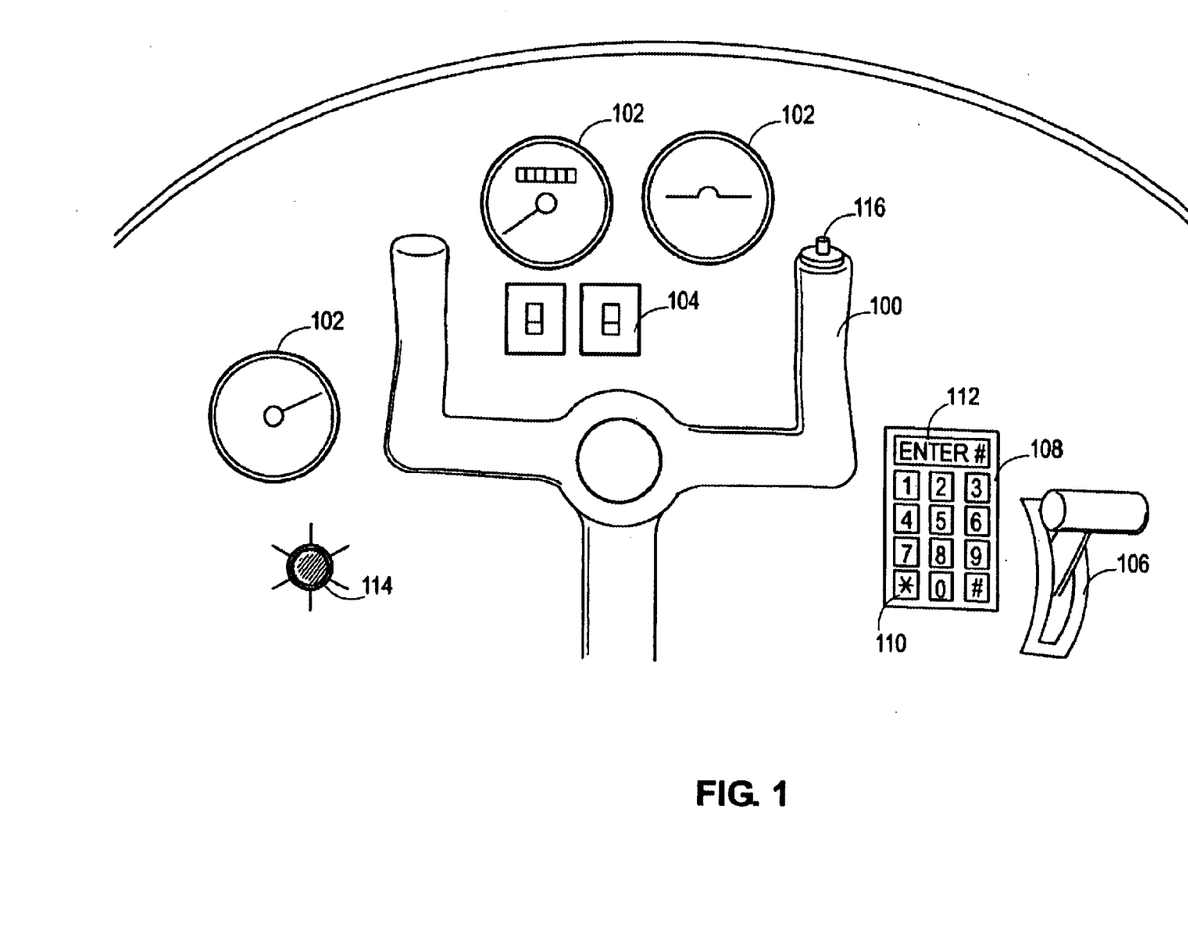
FIG. 1 shows an interior view of the cockpit of an airplane.

FIG. 1 shows the installation of the hardware portion of the system in a aircraft control area, specifically the cockpit of an aircraft. For most aircraft, the cockpit is a restricted area, where only authorized flight crew are supposed to be. The cockpit has a yoke 100 for flight control, a control panel containing instruments 102 and switches 104 for various aircraft monitoring and control functions. The yoke 100 is linked to hydraulic and servo controls which in turn are connected to flight control surfaces such as the rudder, elevators, flaps and ailerons of the aircraft. A throttle control 106 is linked to and controls power from the engine or engines of the aircraft. In an embodiment of the invention, an identifier receiver such as a keypad 108 is located on the control panel. In other embodiments the identifier receiver may be a biometric device such as a microphone or retina scanner or fingerprint reader. The keypad 108 contains numerous keys 110, and may contain a display unit 112. The keypad 108 may be a 12-key touchpad, or any of various other designs. The cockpit also includes a warning light 114. This warning light 114 can be used to alert the pilot to a variety of events of interest to securing the aircraft, as discussed in detail below. The yoke 100 also includes a lock button 116. This button is used to lock out access to the flight controls, and is discussed in more detail below.

Figure 2:
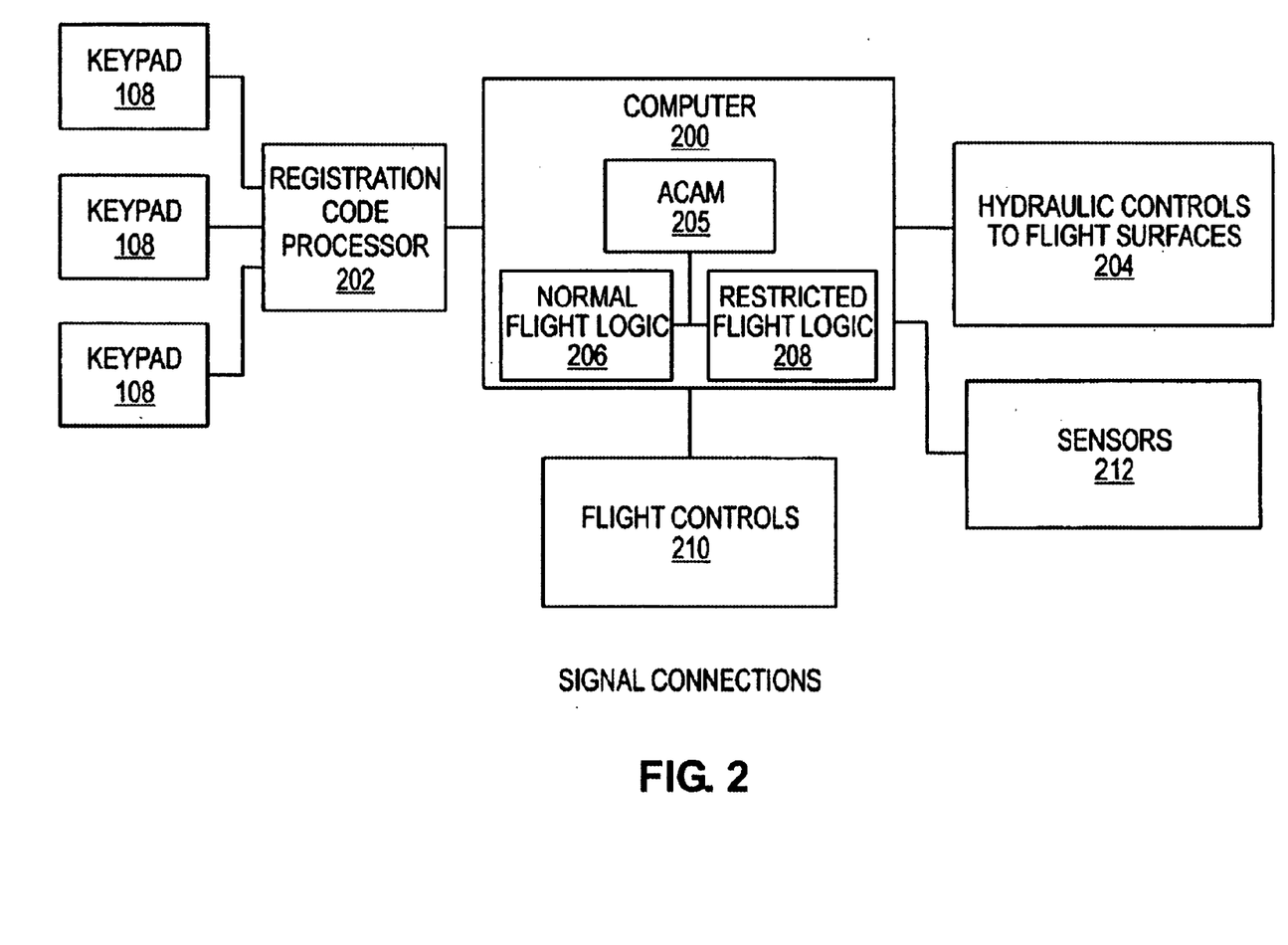
FIG. 2 shows connections of signal paths between components of an embodiment of the invention.

Turning to FIG. 2 an aircraft security system in accordance with an embodiment of the invention is depicted. The system includes one or more identifier receivers, such as keypads 108. These keypads 108 are located at various positions within the aircraft. For example, each pilot station and each flight attendant station within the aircraft may have a keypad 108 or other such identifier receiver associated with it. The identifier receivers all connect to a central computing unit 200 through an identifier processor 202.

The identifier processor 202 monitors and receives signals from the keypads 108. The identifier processor 202 processes the keypad data, and sends information back and forth to the central computing unit 200. The identifier processor 202 stores identifiers received from keypads 108, and compares comparison identifiers received later on with the stored identifiers. The identifier processor 202 communicates the results of these comparisons to the central computing unit 200. The identifier processor 202 is preferably a separate dedicated box, though it may also be a software module within the central computing unit 200. The box and keypads 108 are installed, along with connecting cables, when retrofitting existing aircraft. Communication means, such as a cable, connects the identifier processor 202 with the central computing unit 200.

The central computing unit 200 is the general Flight Management Computer (FMC) that handles various computational tasks throughout the flight. Various flight control input devices 210 also connect to the central computing unit 200. The hydraulic and servo controls 204 for the flight control surfaces also connect to the central computing unit. Various sensors 212 also connect to the central computing unit 200. The flight control input devices 210 generally include the yoke 100 and throttle 106 from FIG. 1, as well as rudder pedals and other pilot inputs. The hydraulic controls 204 are what power the aircraft flight control surfaces, such as the rudder and elevators. The controls 204 may include various sensors, relays, solenoids and the like, including hydraulic, electric, pneumatic and the like which allow the central computing unit 200 to interface with the aircraft flight control surfaces and other physical controls in the aircraft.

The aircraft flight control surfaces are generally hydraulically powered in order to reduce and assist with loads on the yoke 100. Sensors 212 are located in various manners throughout the aircraft, and provide flight data, such as airspeed, altitude, direction, and other information to the central computing unit 200, to assist in processing flight data. The central computing unit 200, flight control input devices 210, controls 204 and sensors 212 generally perform known functions.

The central computing unit 200 is situated between the flight control input devices 210 and the mechanical or hydraulic or servo controls 204 that operate the flight surfaces, engine speed, and other mechanisms. The central computing unit 200 also contains a aircraft control access manager 205, which receives information from the identifier processor 202 and uses this information to grant or deny access to the various aircraft controls 204. In one embodiment of the present invention, the central computing unit 200 has two or more different sets of flight control logic 206 and 208. These different sets of flight control logic 206, 208 may be provided as software updates to the central computing unit 200, as desired. The normal flight control logic 206 generally provides known functions, and supplies algorithms and logic rules for the proper handling of the aircraft control surfaces. Normally the signals from the flight control input devices 210 in the cockpit pass through the central computing unit 200 without any undue restrictions. However, if the identifier processor 202 should signal the aircraft control access manager 205 that a caution mode has been entered, the aircraft control access manager 205 may switch from normal flight control logic 206 to restricted flight control logic 208. When switching to restricted flight control logic 208, the aircraft control access manager 205 limits and overrides at least partially the signals from flight control input devices 210 coming from the pilot, thus preventing the pilot from performing certain actions on the flight control surfaces. Additional sets of flight control logic although not shown, may be provided in order to implement the functions described herein.

In an embodiment, the system described above is used to maintain secure access to the aircraft controls according to the procedure of FIG. 3. When the pilot first takes control of the plane at step 300, that is when pre-departure operations are being performed or the engines are started, the pilot is asked to enter a non-persistent identifier on the keypad 108. The non-persistent identifier is not pre-determined, and may be any number that the pilot wishes to enter, and may be as an example 3 or 4 digits long. For example, the number 243 may be used. The non-persistent identifier is not compared to a database or a reference number or authenticated in a traditional manner in any way. The pilot makes up his own non-persistent identifier, and does not share it with others. The non-persistent identifier entered by the pilot before takeoff is simply stored in the identifier processor 202. The non-persistent identifier is stored only for the duration of the flight.

Figure 3A:
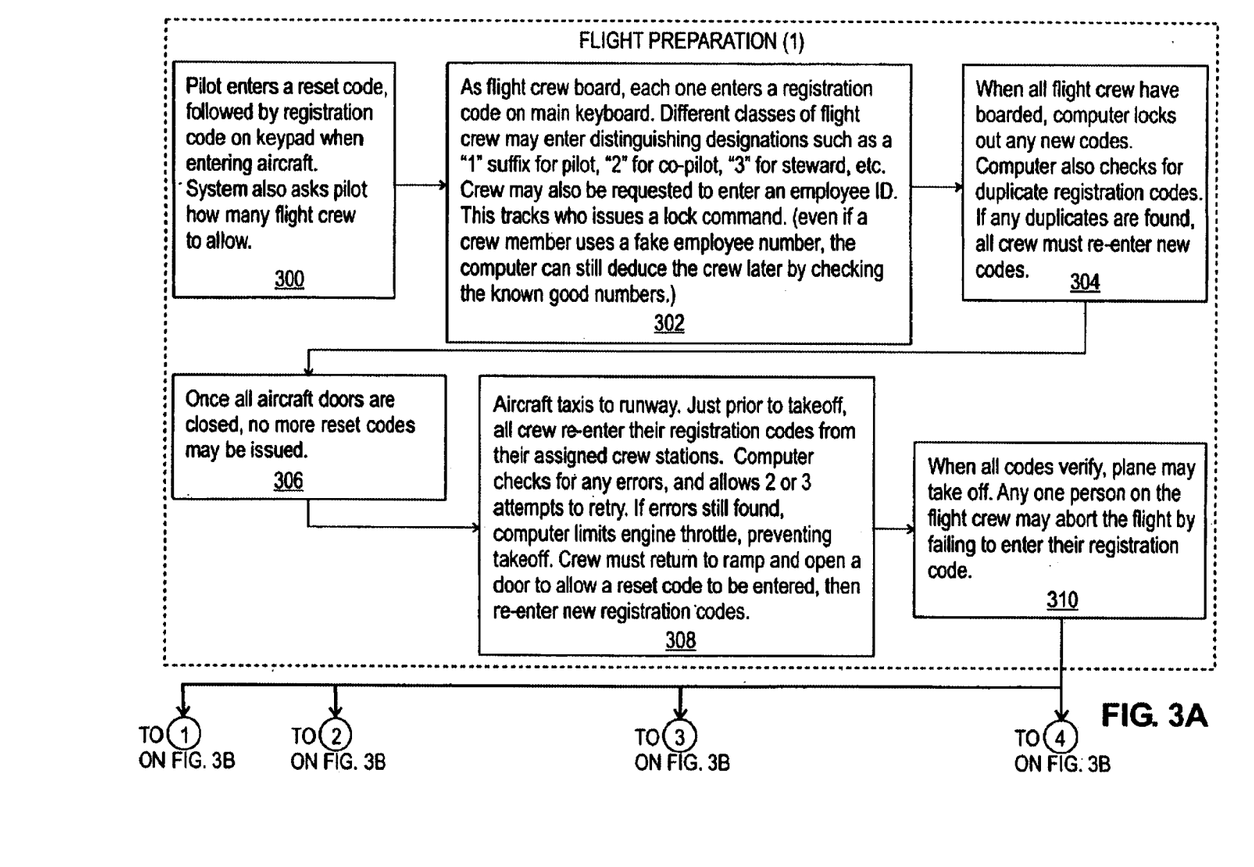
FIGS. 3A–3B is a flowchart of a method of maintaining secure access to a vehicle's controls, according to an embodiment of the invention.
Figure 3B:
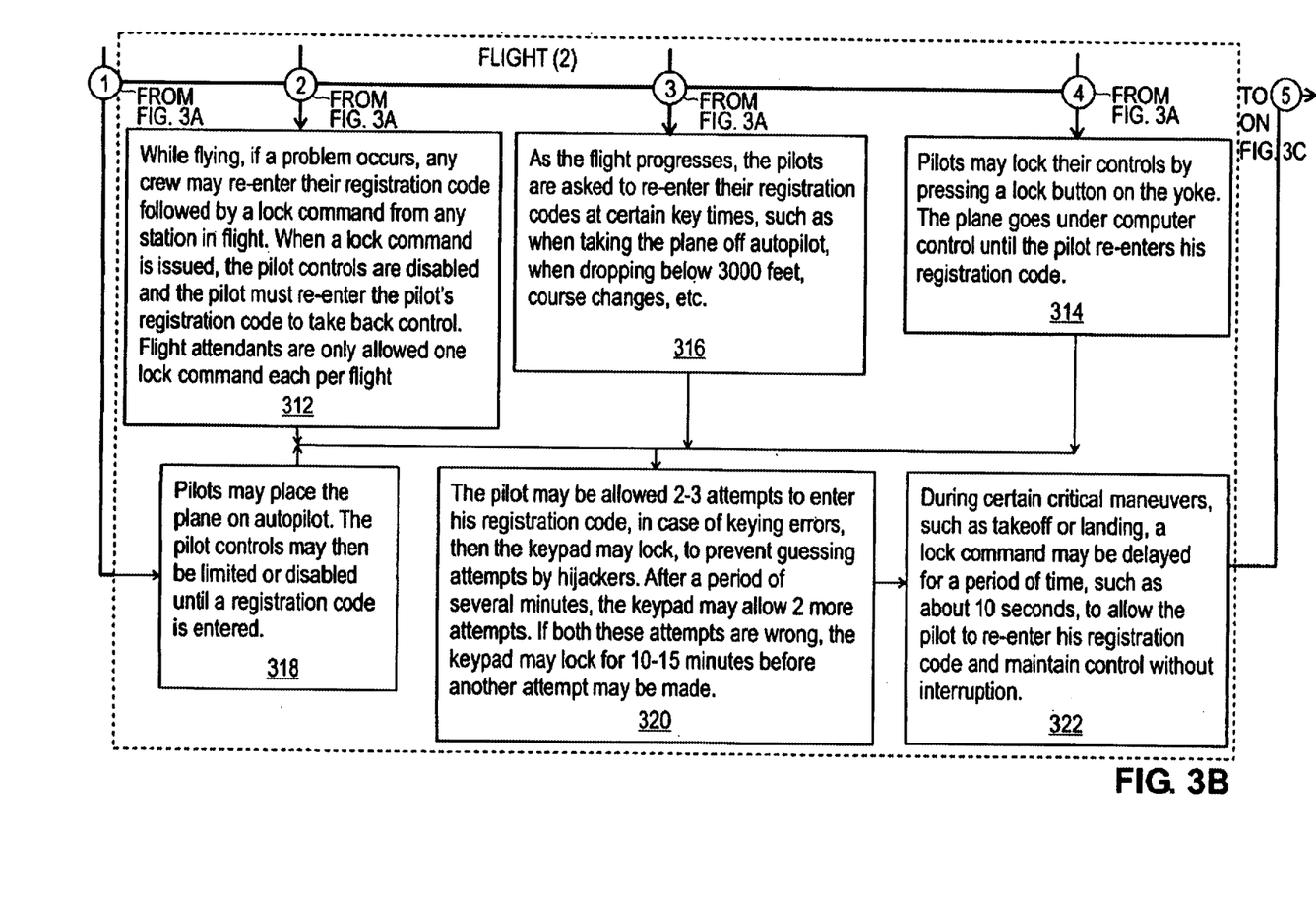
Figure 3C:
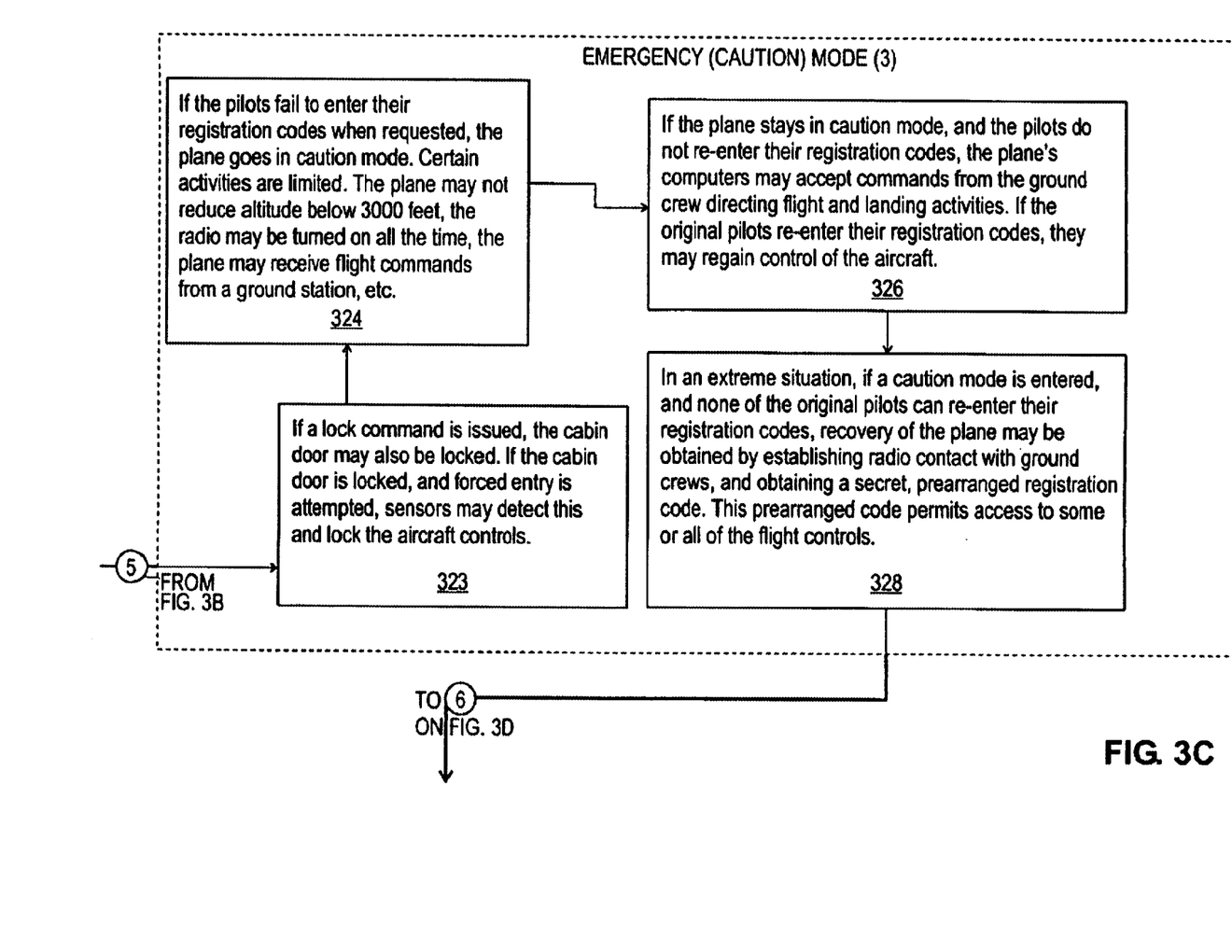
Figure 3D:
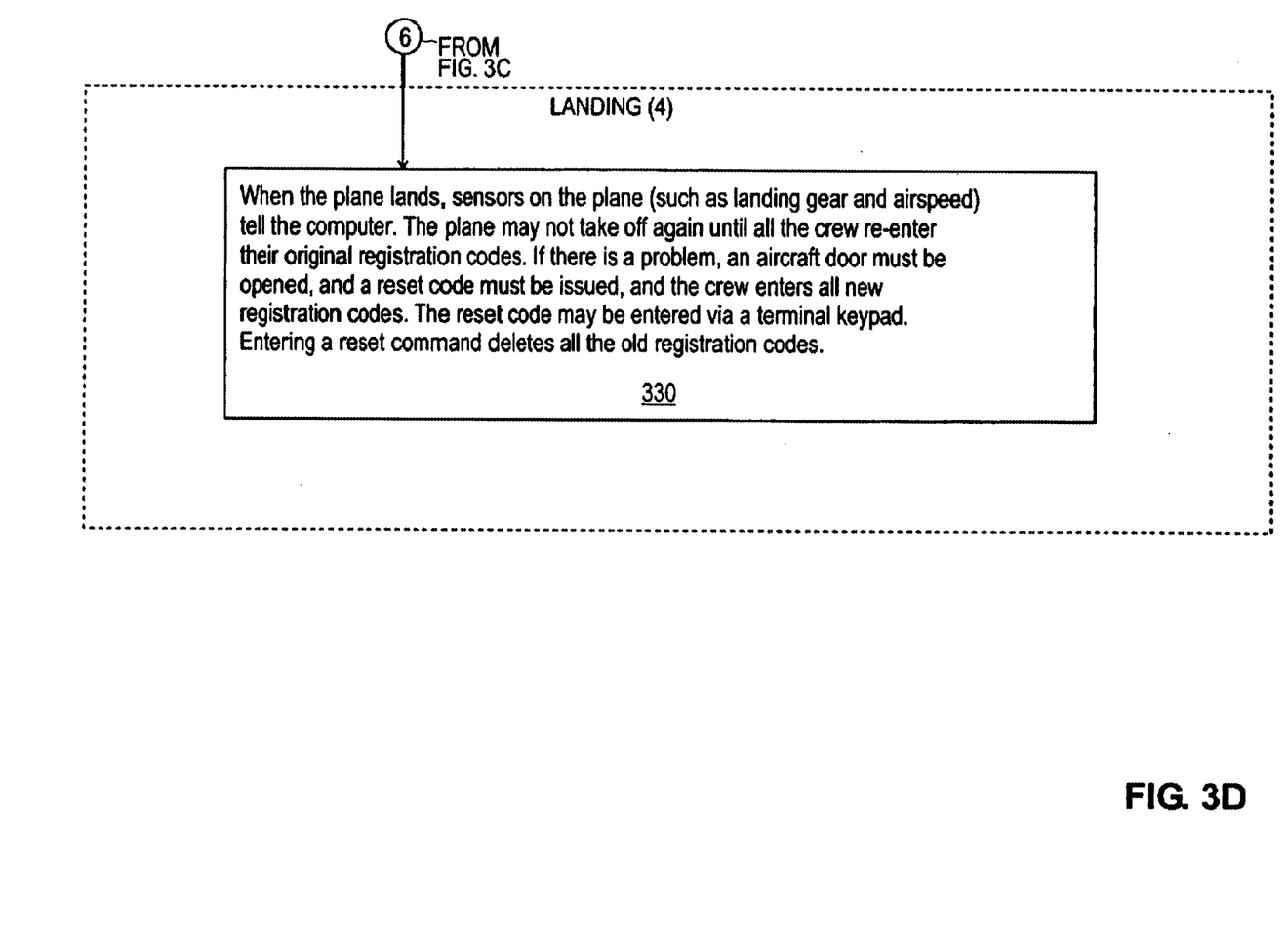

One identifier per pilot is entered. The identifier need not be long to be secure. The pilot or captain does not share his identifier with others. Additional prompts on a display 112 on the keypad 108 may ask the user for the number of pilots and the number of flight crew to allow for the upcoming flight. The pilot may be required to enter the initial data twice, for redundancy and to prevent keying errors.

At step 302, in addition to the pilot(s), the flight crew may be permitted or required to enter their own non-persistent identifiers. The crew identifiers have slightly different functions, as described below. The identifier processor 202 may be configured to recognize different classes of non-persistent identifiers, such as pilot, co-pilot, flight crew, etc. The pilot for example first enters a non-persistent identifier, followed by a "P" or other designation for pilot. The co-pilot then enters his non-persistent identifier followed by a "CP". Other information such as an employee identification number may also be entered. The different classes may have different access profiles. For example, a pilot class may have greater access rights to restricted areas such as the cockpit, or to flight control input devices 210, whereas a flight attendant class may have fewer or no access rights to such systems.

The initial entry of non-persistent identifiers may be restricted to a single keypad 108, to provide physical monitoring of the crew using the keypad 108. This keypad 108 may be located, for example, in a aircraft crew station such as the cockpit area, or one of the flight attendant stations. Thus some interaction of the crew occurs while preparing for flight. Alternately, a keypad 108 may be placed outside the aircraft in the terminal. When the crew boards, they enter a non-persistent identifier into the keypad 108 in the terminal, where their identity may be more easily confirmed by airline staff, such as staff at the boarding gate. The terminal keypad 108 is electronically connected to the identifier processor 202 aboard the aircraft.

At step 304, the non-persistent identifiers are confirmed. If two crew members should inadvertently enter the same non-persistent identifier, the system may issue a warning. All non-persistent identifiers are deleted from the system, and all crew members are required to enter new and different non-persistent identifiers. This prevents accidental disclosure of ones' non-persistent identifier.

Once the flight begins, or preferably once the aircraft doors are closed, at step 306 additional entry of a non-persistent identifier in normal operation is prevented. The aircraft control access manager 205 may control this automatically. For example, sensors 212 on the doors indicate when all the aircraft doors are closed. This data is sent to the central computing unit 200. If all the doors are closed, the aircraft control access manager 205 notifies the identifier processor 202 to prevent the further entry of new non-persistent identifiers. The central computing unit 200 and identifier processor 202 are securely located in the aircraft, and their computer programming may not be easily changed in flight.

The aircraft control access manager 205 will not release full control of the aircraft to the pilot until a non-persistent identifier is entered. After the pilot enters a non-persistent identifier, takeoff preparations may proceed at step 308. In one embodiment of the system, confirmation of the identifiers is required before takeoff. For example, just before takeoff, some several minutes after the non-persistent identifiers were initially entered, and after the airplane doors are closed and the flight crew are at their stations distributed throughout the plane, all members of the crew may be required to re-enter their non-persistent identifiers on local keypads 108, as confirmation identifiers, to confirm that all is in order. The identifier processor 202 compares these confirmation identifiers with the previously recorded non-persistent identifiers, to verify that every member of the flight crew has confirmed their non-persistent identifier.

If an incorrect confirmation identifier is entered, the keypad 108 where the incorrect confirmation identifier was entered may have a light or buzzer on it that shows an incorrect confirmation identifier was entered. If a confirmation identifier is entered incorrectly, the system may allow a second or third chance to enter the confirmation identifier correctly. If there is still an error, the system may require a reset procedure to be enacted. In an example procedure, the aircraft door is opened, and a reset code is issued and all the original non-persistent identifiers are re-entered.

Entry of these confirmation identifiers may occur when the pilot makes an announcement, when a tone is sounded, or when a digital display prompts the crew, just before the throttles are advanced for takeoff. The pilot may call for the confirmation identifier sequence to begin by entering a non-secret code on the keypad 108, or the aircraft control access manager 205 or identifier processor 202 may do so automatically. There is preferably only a short window of opportunity for each crew member to enter his or her confirmation identifier.

The confirmation identifier serves several purposes. It verifies that each crew member remembers their non-persistent identifier. It also finds any errors or attempts to enter fake identifiers, and it gives any one person on the crew one final chance to abort the flight. It also assures the plane cannot take off without the minimal required crew present.

Also, depending on the location of the keypad 108 on which the confirmation identifier was entered, for example next to the pilot's seat, copilot's seat, or flight attendant seat, the identifier processor 202 assigns access permission levels for the non-persistent identifier which was confirmed by the confirmation identifier, for the remaining duration of the flight. For example, a crew member may have entered a non-persistent identifier of 655 when first boarding the aircraft. The identifier processor 202 has the 655 number, but may not know if the crew member is a pilot or flight crew. When the confirmation identifiers are entered, the identifier processor checks to see which keypad 108 the confirmation identifier bearing the 655 number was entered from. If it is entered at the captain station, the 655 number is assigned pilot privileges for the flight. If the 655 number is entered at a flight attendant station, only flight attendant privileges are assigned to that non-persistent identifier.

At step 310, if all previously entered non-persistent identifiers are not confirmed, with no excess or shortages, a flight error occurs and the throttles or controls are computer-limited to prevent takeoff. Thus if any member of the flight crew does not have confidence in any other member of the flight crew, that member may abort the flight.

At step 312, if a restricted or unusual event occurs, for example the plane deviates from an assigned or prearranged course, the aircraft control access manager 205 may ask the pilot to re-enter his non-persistent identifier. If the pilot and/or co-pilot fail to re-enter their non-persistent identifiers, the plane is considered to no longer be under control of the original pilot, and switches to caution mode, or performs some other restriction action.

Additionally, the pilots or flight crew may use additional keypads 108 outside the cockpit to trigger a restricted event and lock access to the controls by entering their non-persistent identifier, followed by a standard lock code. The lock command may thus be used to put the plane in a stable state in the case of a struggle. In an embodiment of the invention, the flight crew has keypads 108 distributed throughout the aircraft at flight attendant stations. The flight attendant keypads may allow a cockpit door to be unlocked, and they may also allow the flight attendant to enter a lock or caution mode command to the aircraft control access manager 205. The flight attendant enters his non-persistent identifier, followed by a fixed code to open the cabin door, or another fixed code to issue a lock command, which tells the aircraft control access manager 205 to lock the pilot control input devices 210. It also locks the cockpit door. Each flight attendant may be allowed to issue only one lock command per flight to prevent improper interfering with the flight.

The distributed keypads 108 at different locations throughout the aircraft make it difficult for a hostile person or group to take over control of all keypads 108 at once. It also provides some redundancy in the case a keypad 108 should malfunction. After the lock command, one of the original pilots must re-enter their original non-persistent identifier to resume flying. If someone other than a pilot enters a lock command, such as a member of the flight crew, there may be a short delay, such a 10 seconds, before the lock signal takes effect, in order to allow the pilot to re-enter their non-persistent identifier and resume uninterrupted flight control.

Alternatively, at step 314, lock button 116 provided in the cockpit or on the flight yoke 100 is activated by the pilot or other flight crew. The identifier processor 202 constantly monitors the keypads 108 and lock button(s) 116. If the pilot steps away from the controls for a period of time, or is challenged, he may press the lock button 116. A command is sent from the lock button 116 to the identifier processor 202 and to the aircraft control access manager 205, and some or all pilot controls are then disabled. The pilot then must re-enter his non-persistent identifier, as a confirmation identifier, in order to regain control of the aircraft.

Alternately, the aircraft control access manager 205 is configured to ask or require the pilot to re-enter his non-persistent identifier several times during the flight, at step 316. These times are preferably at key points, for example such as when taking the plane off autopilot, or when dropping below a certain altitude or below a minimal ground clearance such as 3000 feet for a landing. Alternately, when the pilot places the aircraft on autopilot, the controls may be disabled until one of the pilots enters his non-persistent identifier, at step 318. The autopilot is prevented from being disengaged until a valid comparison identifier is entered.

If for any reason the pilot or other flight crew is required to provide his non-persistent identifier, and the pilot enters an incorrect identifier, then at step 320, the pilot is afforded the opportunity to re-enter his identifier. This guards against keying errors made by the pilot, who may be under the stress of an unusual event. However, it is desirable to prevent unauthorized personnel to guess the non-persistent identifier through repeated entry attempts. Therefore, upon detecting too many attempts, the identifier processor 202 will lock out the keypads 108 for a period of time, and will enter caution mode. The identifier processor 202 may initially lock out the keypads 108 for a short period of time, such as 2–3 minutes, upon detection of repeated identifier entry failures. If after this period expires, additional identifier entry failures are detected, the identifier processor 202 will lock out the keypads 108 for a longer period of time, such as 10–15 minutes, or longer.

During certain critical flight maneuvers, such as take-offs and landings, at step 322 the restriction action, such as a lock command, will not be immediately enforced. This prevents the sudden interruption of these critical flight maneuvers, and avoids the potentially disastrous consequences of such interruptions. The lock command may be delayed for a brief period of time, to allow the pilots time to complete the maneuver, or to cancel the lock command by entering their own non-persistent identifier.

If a lock command is issued, then at step 323 other systems located in the airplane, such as an optional lock on the cockpit door may be activated. The lock is electronically controlled, by the aircraft control access manager 205. A keypad 108 on the outside of the door allows pilots to enter their non-persistent identifiers to gain access. Flight attendants may also be permitted to enter their non-persistent identifiers. Under normal operations, the lock may require only one flight attendant to enter his/her non-persistent identifier, to gain access. This would aid in minimizing disruptions to the flight attendant's normal duties. Under caution mode conditions, however, the lock may require three or more flight attendants to all enter their non-persistent identifiers before the door will open.

Wires and sensing devices may be placed in the cockpit door. If forcible entry or an attempted forcible entry occurs the system triggers the lock command, the flight control input devices 210 are disabled, and the plane goes into caution mode until and unless the pilots re-enter their non-persistent identifiers. As noted above, the system may be configured to prevent or delay such lock triggering in the middle of certain critical maneuvers, such as takeoff and landing.

If the pilot is unable to or otherwise fails to re-enter his non-persistent identifier when taking the plane off autopilot, changing altitude, changing course, or when otherwise requested by the aircraft control access manager 205, a caution mode is entered at step 324. In the caution mode, at least partial access to the controls 204 of the airplane from the pilot are disabled. Automatic flight control systems, such as the autopilot or other systems controlled by the central computing unit 200, take over where pilot access is restricted, and prevent the aircraft from engaging in certain maneuvers, for example landing or reducing altitude below 3000 feet from the ground.

These automatic flight control systems are generally controlled by software portions of the central computing unit 200. The central computing unit 200 uses various flight control logic to regulate the movement of the flight control surfaces such as the rudder and the elevators. The algorithms help correct for pilot errors in normal flight. For example they prevent excessive rudder deflection at high speeds, while allowing more rudder deflection at low speeds for more control. When entering a caution mode, the central computing unit 200 switches the software control algorithms from a set of normal flight control logic 206 to a set of restricted flight control logic 208.

The restricted flight control logic 208 used in caution mode restricts the pilot's activities. The plane may still be flown, but for example cannot land or be steered below 3000 feet. Other limitations may also be placed on the pilot's activities. Course changes may be restricted or prevented. The aircraft may be allowed to land only at certain geographic locations. The restricted flight logic is designed to limit or prevent unauthorized piloting of the aircraft. By restricting the pilot's capabilities in certain limited ways, it is possible to allow the aircraft to continue flying, without allowing the aircraft to be precisely controlled in a manner than could be excessively destructive. If the pilot should re-enter his non-persistent identifier, at any time, the identifier processor 202 will compare the identifiers and upon recognizing a match will signal the aircraft control access manager 205 to switch the restricted flight control logic 208 back to normal flight control logic 206. The pilots may then regain full normal control of the aircraft.

If the pilots fail to supply their original non-persistent identifiers, and the ground controllers are not satisfied that the plane is in safe hands, the plane is considered in unauthorized or hostile hands, at step 326. At this point, additional flight control logic may be transferred from the ground to the central computing unit 200 in the aircraft, or preprogrammed flight control logic stored in the central computing unit 200 may be accessed, to determine, limit, or control which flight activities are permitted. The aircraft control access manager 205 may switch to a second restricted flight control logic that includes additional restrictions on flight activities. Such flight control logic may even cause the plane to come under the full flight control of a ground station. The pilot can still recover control of the aircraft and lock out the ground commands by entering his original non-persistent identifier.

In an extreme situation, at step 328 a backup system is activated in case of caution mode entry, or if all pilots forget their non-persistent identifiers. While each pilot makes up his own non-persistent identifiers when commencing pre-flight operations, a second secret identifier is permanently programmed into the identifier processor 202. A record of the second secret identifier is kept in a secure location on the ground. The second secret identifier is only accessed in the rare case of a caution mode entry, and is not handled in normal use.

To access the secret pre-arranged identifier, ground contact must be established, via radio or other means. If the ground controllers are satisfied that the plane is in safe hands, they may locate the second secret identifier stored in a database or elsewhere on the ground, and give that identifier to the new pilot, who may enter it to regain control of the plane. The new pilot may then be required to enter a new personal non-persistent identifier.

When using the second secret identifier, the aircraft control access manager 205 may be programmed to accept radio signals from the ground that can re-disable the flight control input devices 210 if a problem should occur, such as if the ground controllers realize they have been deceived by a hijacker. Also, multiple pre-arranged secret identifiers may be used, with different levels of activity permitted to the pilot by each identifier. Thus an initially untrusted replacement pilot may be given more limited access to the flight control input devices 210, and as the pilot becomes more trusted, additional access may be granted. The pre-arranged identifiers may be longer then the others, for example 12 or 16 digits long, to make attempts to guess the code more difficult.

At step 330, when the flight is over and at least one aircraft door is open, and as long as sensors 212 such as landing gear position and airspeed sensors indicate that the aircraft is on the ground, the non-persistent identifiers entered from the last flight are deleted. This may be done automatically by a reset command from the identifier processor 202, or alternately a designated reset command may be manually entered at one of the keypads 108. The plane may take off and land several times, but a new non-persistent identifier can not be entered unless one of the aircraft doors is opened, or some other specified flight termination event occurs, such as the aircraft auxiliary power unit is engaged, or the central computing unit 200 is connected to computers in the terminal. The non-persistent identifiers are intended to be retained until it is clear that the flight is over.

The reset code erases all the non-persistent identifiers stored in the computer. It also allows the crew to enter new non-persistent identifiers before the next flight proceeds, thereby allowing for crew changes. As discussed above, once the aircraft doors are closed and the flight begins, this ability to reset or delete the non-persistent identifiers is disabled. Because the pilot and flight crew non-persistent identifiers are automatically deleted when the doors are opened, they are not left stored in the identifier processor 202, where an unauthorized person such as a hacker could gain access to them. A pilot may therefore conveniently keep the same personal non-persistent identifier indefinitely, as long as no unauthorized person sees them enter their identifier on the keypad 108.

Figure 4:
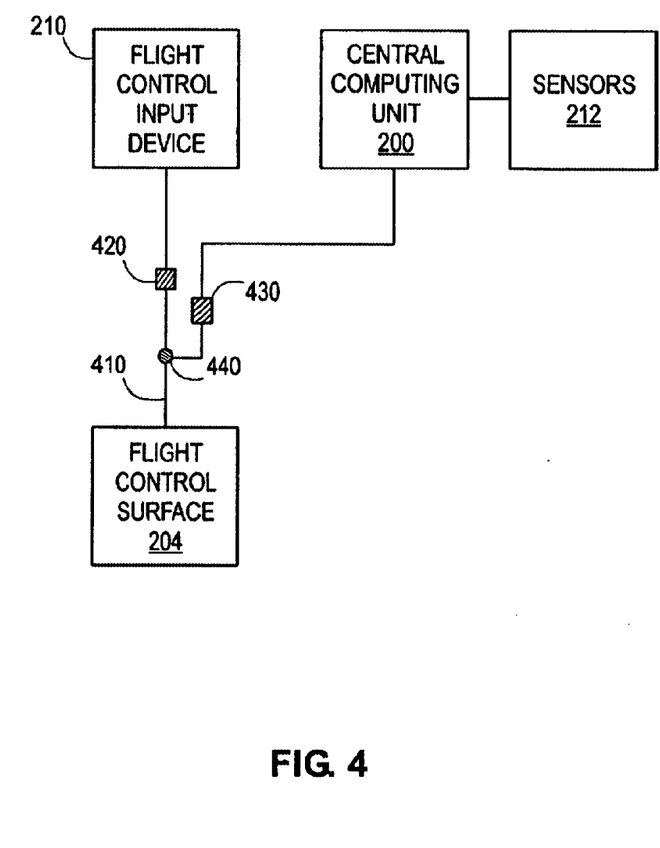
FIG. 4 shows a control coupling system in an aircraft.

Turning to FIG. 4, on a hydraulically actuated control system, disengagement of the flight control input devices 210 is accomplished for example by switching a solenoid 440 that diverts hydraulic control signals on the shuttle valve 420 from the joystick linkage to an electrically operated valve 430 controlled by the central computing unit 210. The hydraulic system operates in series mode, so interaction between the flight control input devices 210 and the central computing unit 210 is eliminated. The central computing unit 210 connects to sensors 212 such as airspeed, pitch, yaw, etc, and directs the aircraft operation in a stable manner.

On airplanes with a manual control override, that is where the flight yoke 100 is still active at the same time the autopilot is active, caution mode disengages at least some of the aircraft functions from the yoke 100 or other flight control input devices 210, such as the elevator control. The autopilot, central computing unit 200. and electrically operated hydraulic valve 430 continue to control the aircraft without pilot input. The linkage disengage switch may be a solenoid operated device that is under control of the central computing unit 200. When activated, the disengage solenoid disengages a mechanical linkage coupling from the joystick to the flight control surfaces. The solenoid may have a pin-and-groove or pin-and-hole arrangement with a return spring or springs to decouple the mechanical inputs, yet allow failsafe re-coupling when the solenoid releases. The central computing unit 200 and autopilot system monitors it's own health while running. If the central computing unit 200 should fail, the manual disengage solenoid is spring loaded to re-engage and to provide pilot recovery. If for some reason the autopilot should quit working, the lock command may be automatically disabled. In this case, no security functions are available until the autopilot is fixed.

In this way, it is assured that only the original pilots are in control of the flight throughout the flight. Yet there is zero administration overhead on the part of the airline and ground crew in normal operation. Because the pilots make up their own registration codes at the time of the flight, there is no administrative overhead cost on the part of the airline in assigning and recording and managing passwords. There are no passwords for the ground crew to keep track of, and no keys or other codes to keep track of or lose. There is strong failure resistance, as any of the pilots may at any time regain control of the aircraft by entering their non-persistent identifier. The system may be used in combination with other security measures, such a pilot identification systems. The only inconvenience is the pilot must press a few buttons several times during the flight.

Various minor changes and modifications may be made to the sequences and actions and still fall within the scope of embodiments of the invention. The system may for example turn on the radio voice transmitters continuously if a lock command or caution mode is entered. An alert signal may be sent to the ground crew, which allows ground crews to gather better information. The system may or may not have a cabin door lock. The system may also permit landing activities below 3000 feet in a caution mode, but only at designated locations. Different altitude thresholds other than 3000 feet may be used.

If the system is in caution mode for more than a certain period of time, for example 10 minutes, and the pilot(s) do not respond with a proper non-persistent identifier, the central computing unit 210 may switch to a different flight control logic and accept electronic flight commands from the ground that steer the aircraft in a direction so as to avoid crashing in populated areas, or commands that land the aircraft. The commands received from the ground crew take effect unless a proper non-persistent identifier is entered.

Voiceprint, fingerprint, or retina scan, or other such biometric devices may be used as an aid in allowing the pilot to enter non-persistent identifiers. However, such devices should not be used exclusively as they may be easily defeated by placing a finger for example in a scanner after the pilot has been knocked out. Authentication devices such as metal keys or pre-arranged password codes may be used before the pilot is permitted to enter a reset code at the start of the flight as an extension of the system.

The keypad 108 preferably contains a display device 112, such as an L.E.D. digital display, to aid the pilot. The display may prompt the pilot to enter his non-persistent identifier, or warn the pilot a lock command has been issued from a flight attendant station. Lights 114 or buzzers may indicate a caution mode.

Although the term central computing unit is used, the actual computing mechanism and identifier processor may be distributed across several computers in the aircraft, or consolidated into a single computing unit. As used herein the term central computing unit or processor is meant to encompass all such configurations.

Thus embodiments of the invention provide effective and practical ways of providing security to prevent unauthorized aircraft use. In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

I claim:

1. A method of securing a vehicle, comprising:

commencing pre-departure operations, creating in a security system a non-persistent identifier after commencement of pre-departure operations, entering the non-persistent identifier into an identifier receiver, storing the non-persistent identifier in an identifier processor, monitoring during operation of the vehicle for a restricted event, requesting entry of a comparison identifier upon detection of the restricted event, allowing the restricted event to proceed if the comparison identifier matches the non-persistent identifier, performing a restriction action if the comparison identifier does not match the non-persistent identifier, terminating operation of the vehicle, and clearing the non-persistent identifier from the identifier processor;
wherein the non-persistent identifier includes an access code that is not pre-arranged in the identifier processor prior to activation of the security system, the access code being uniquely created by a user each time the security system, is activated by the user.

2. The method of claim 1, wherein entering the comparison identifier comprises re-entering the non-persistent identifier.

3. The method of claim 1, wherein the vehicle comprises an aircraft.

4. The method of claim 3, wherein the aircraft comprises an autopilot and the restricted event comprises disengaging the autopilot.

5. The method of claim 4, wherein the restriction action comprises preventing the autopilot from being disengaged.

6. The method of claim 4, wherein the restriction action comprises turning control of the aircraft over to a backup controller.

7. The method of claim 6, wherein the backup controller is located on the ground.

8. The method claim 3, wherein the restricted event comprises descending below a pre-defined altitude.

9. The method of claim 8, wherein the restriction action comprises preventing the aircraft from descending below the pre-defined altitude.

10. The method of claim 1, wherein the restricted event comprises deviating from a pre-defined course.

11. The method of claim 1, wherein the restriction action comprises transmitting a warning.

12. The method of claim 1, wherein the restriction action comprises limiting access to one or more control systems of the aircraft.

13. The method of claim 1, further comprising detecting an identifier lockout event, and preventing entry of the non-persistent identifier once the identifier lockout event has occurred.

14. The method of claim 13, wherein the identifier lockout event comprises the closing of an aircraft door.

15. The method of claim 14, wherein the aircraft door is the last aircraft door to be closed.

16. The method of claim 13, wherein the identifier lockout event comprises the commencement of flight operations.

17. The method of claim 1, wherein creating a non-persistent identifier after commencement of pre-departure operations comprises creating the non-persistent identifier as part of the pre-departure operations.

18. The method of claim 1, wherein creating a non-persistent identifier after commencement of pre-departure operations comprises creating a plurality of non-persistent identifiers, corresponding to a plurality of vehicle crewmembers.

19. The method of claim 1, wherein performing a restriction action comprises entering a caution mode.

20. The method of claim 19, wherein entering a caution mode comprises switching normal flight control logic to restricted flight control logic.

21. The method of claim 1, further comprising recovering a backup identifier.

22. The method of claim 1, wherein clearing the non-persistent identifier from the identifier processor comprises clearing the non-persistent identifier only after vehicle operations have been terminated.

23. The method of claim 1, wherein the restricted event comprises issuance of a lock command.

24. The method of claim 1, wherein the restricted event comprises an unauthorized entry into a restricted area within the vehicle.

25. The method of claim 1, further comprising entering a confirmation identifier subsequent to entering the non-persistent identifier into the identifier receiver module and prior to commencement of vehicle departure.

26. A system for securing a vehicle, the vehicle comprising one or more vehicle controls, the system comprising:
an identifier receiver adapted to receive a non-persistent identifier;
an identifier processor adapted to store the non-persistent identifier, to compare the stored non-persistent identifier with a comparison identifier, and to provide a comparison result; and
a vehicle control access manager adapted to receive the comparison result from the identifier processor, and to grant or deny access to the one or more vehicle controls depending on the comparison result;
wherein the non-persistent identifier includes an access code that is not prearranged in the identifier processor prior to activation of the system, the access code being uniquely created by a user each time the system is activated by the user, and
wherein the vehicle control access manager is adapted to detect a restricted event report the restricted event to the identifier processor and request entry of the comparison identifier, and wherein the restricted event occurs during vehicle operations.

27. The system of claim 26, wherein the identifier receiver comprises a keypad.

28. The system of claim 26, wherein the identifier receiver comprises a biometric device adapted to receive biometric identifier.

29. The system of claim 26, wherein the identifier receiver is located proximal to a vehicle crew station within the vehicle.

30. The system of claim 29, wherein the vehicle crew station comprises an aircraft cockpit.

31. The system of claim 29, wherein the vehicle crew station comprises an aircraft flight attendant station.

32. The system of claim 26, wherein the identifier receiver is located in a vehicle departure area external to the vehicle.

33. The system of claim 32, wherein the vehicle departure area comprises an airport terminal.

34. The system of claim 26, wherein the identifier processor comprises an identifier storage module and an identifier comparison module.

35. The system of claim 26, wherein the identifier processor is adapted to recognize a plurality of identifier classes, each identifier class having a different access profile.

36. The system of claim 35, wherein the plurality of identifier classes includes at least an aircraft flight crew class and an aircraft flight attendant class.

37. The system of claim 26, wherein the identifier processor is adapted to receive a restricted event warning from the vehicle control access manager, and to request entry of the comparison identifier.

38. The system of claim 26, wherein the identifier processor is adapted to contain a backup identifier.

39. The system of claim 38, wherein the backup identifier comprises a plurality of backup identifiers, each backup identifier granting different levels of access to the one or more vehicle controls.

40. The system of claim 26, wherein the identifier processor is adapted to prevent entry of the non-persistent identifier once pre-departure operations have been completed.

41. The system of claim 26, wherein the identifier processor is adapted to reset the non-persistent identifiers upon completion of a trip by the vehicle.

42. The system of claim 41, wherein the system further comprises a sensor, and completion of a trip is detected by gathering sensor data from the sensor.

43. The system of claim 42, wherein the vehicle comprises an aircraft, and the sensor data comprises data indicating that the aircraft is on the ground.

44. The system of claim 43, wherein the sensor data comprises landing gear status data.

45. The system of claim 43, wherein the sensor data comprises airspeed data.

46. The system of claim 26, wherein the identifier processor is adapted to require a confirmation identifier be entered subsequent to entry of the non-persistent identifier and prior to commencement of departure operations.

47. The system of claim 46, wherein the identifier processor is adapted to prevent departure operations from commencing until a plurality of confirmation identifiers corresponding to a plurality of vehicle crew members have been received.

48. The system of claim 47, wherein the confirmation codes are entered substantially simultaneously at two or more points physically dispersed throughout the aircraft.

49. The system of claim 26, wherein the vehicle control access manager comprises a module within an aircraft flight management computer, the aircraft flight management computer adapted to interface a vehicle control input device with a vehicle control.

50. The system of claim 49, wherein the flight management computer is adapted to contain a plurality of flight control logic modules, and the vehicle control access manager is adapted to select one of the plurality of flight control logic modules depending on the comparison result.

51. The system of claim 50, wherein the vehicle control access manager is adapted to enter a caution mode if the comparison result indicates that the comparison identifier and the non-persistent identifier do not match.

52. The system claim 26, wherein the restricted event comprises a vehicle course deviation.

53. The system of claim 26, wherein the restricted event comprises a vehicle altitude change.

54. The system of claim 26, wherein the restricted event comprises a vehicle autopilot deactivation.

55. The system of claim 26, wherein the vehicle control access manager is adapted to physically disconnect the control input device from the vehicle control.

56. The system of claim 26, wherein the vehicle comprises an aircraft, and vehicle operations comprise in-flight operations of the aircraft.

* * * * *